United States Patent Office 2,920,790
Patented Jan. 12, 1960

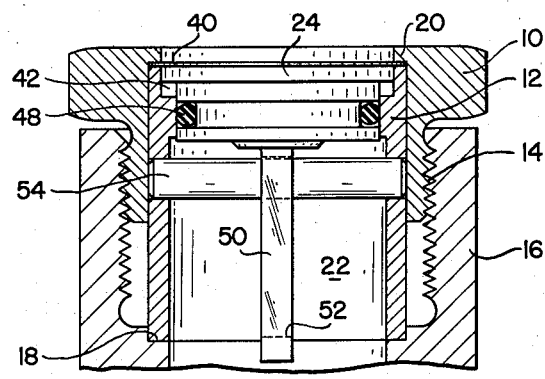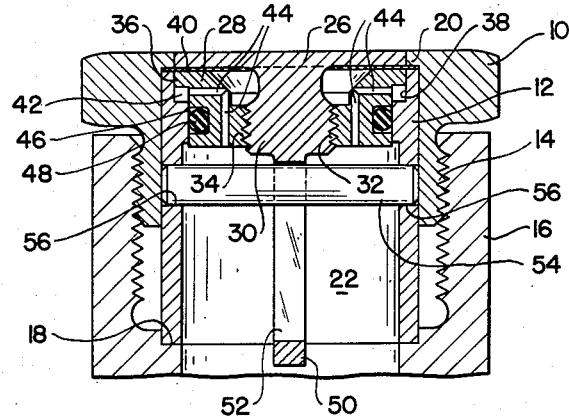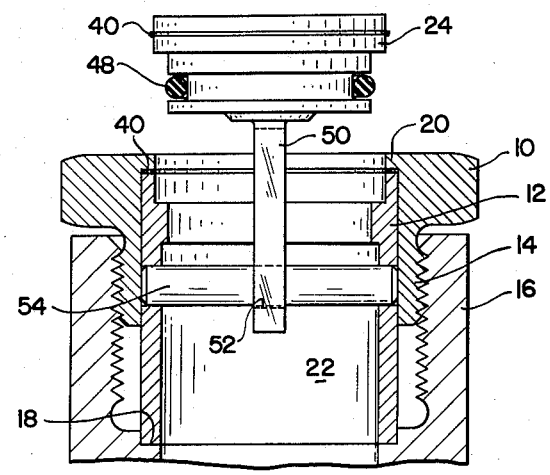

2,920,790

PRESSURE RELIEF VALVE

Raymond N. Quenneville, Holyoke, Mass., and Earl K. Moore, North Granby, Conn., assignors to United Aircraft Corporation, East Hartford, Conn., a corporation of Delaware Application July 2, 1958, Serial No. 746,113

6 Claims. (Cl. 220—89)

This invention relates to an improved pressure relief valve adapted for connection to a conduit or other enclosure containing a fluid under pressure.

It is the general object of the present invention to provide a pressure relief valve which is operable to open and relieve pressure when subjected to sustained or continuing pressures in excess of a first predetermined pressure level and which is operable to open and relieve pressure when subjected to momentary pressures in excess of a second and higher predetermined pressure level.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

Fig. 1 is a longitudinal sectional view through the valve housing and showing the relief valve in closed position;

Fig. 2 is a longitudinal section of the valve similar to Fig. 1, but with the valve means within the housing also shown in section; and Fig. 3 is a view similar to Fig. 1, but with the valve shown open.

The pressure relief valve of the present invention has utility in any pressurized fluid system wherein it is desired that pressure be relieved when it exceeds a first predetermined level for a substantial period of time and when it momentarily exceeds a second and higher predetermined level. The utility of the valve is, however, particularly well illustrated by a consideration of its use in connection with fuel-air starting systems for aircraft turbine engines.

Fuel-air starting systems for aircraft engines normally include a combustion chamber wherein pressurized gases are generated for driving a turbine which accelerates the aircraft engine for starting through a suitable system of gears. There are also normally included in such starting systems several conduits carrying fluids under pressure, such as conduits for supplying the combustion chamber with fuel and air under pressure and conduits for supplying the gaseous products of combustion to the starter turbine. It is of course necessary that the majority of the components of the starter system be protected against failure due to excessive pressures and it has, therefore, been the usual practice to include one or more relief valves of conventional construction in such starting systems. The pressure releasing operation of such valves has not, however, been entirely satisfactory.

Ordinarily the opening pressures of the relief valves in the starting system are established in keeping with the highest sustained or continuing pressure which the starting system components can safely accommodate. Initiation of the combustion cycle in a fuel-air starting system is often accompanied by momentary pressure surges throughout the system. The peak pressures occurring during such surges frequently exceed the pressure limits established for the relief valves in the system with the result that the said valves are opened to relieve pressure and the starting system is rendered inoperative. Due to the short duration of the excessive peak pressures which occur during such surges, however, the said pressure may not be unsafe or harmful to any of the components of the starting system. Thus, rendering of the system inoperative by the relief valves may be unwarranted. The establishment of higher opening pressures for the system relief valves so as to accommodate safe pressure surges is unacceptable for this would permit the existence in the starting system of unsafe sustained high pressures. On the other hand, the provision of system components which are better able to withstand high pressure along with the establishment of relief valve opening pressures sufficiently high to accommodate safe pressure surges as well as safe sustained high pressures would obviously entail a considerable increase in overall system weight, a highly undesirable characteristic in the field of aircraft design.

It will be apparent from the description given hereinafter, that a fuel-air starting system for aircraft engines may readily be equipped with one or several of the pressure relief valves of the present invention and that starting systems so equipped may be constructed at a considerable saving in weight and yet not be susceptible to unwarranted inoperability due to the unnecessary relief of system pressure resulting from pressure surges.

The before-mentioned dual pressure level relief operation of the relief valve of the present invention is achieved by providing two separate pressure surfaces or areas which face approximately in the same direction on a valve means which is held by frangible means in closed position in a fluid passageway. The fluid passageway receives fluid under pressure at one end and communicates at the other end with a low pressure environment suitable for relieving pressure. One of the pressure areas on the valve means is acted on directly by fluid in the passageway to break the frangible means and open the valve while the other pressure area is acted on by fluid from the said passageway which is first conducted through a restricted second passageway. The restricted passageway introduces a time delay period so that when the fluid pressure in the main valve passageway changes rapidly, the full effect of the change is not immediately felt on the said other pressure area.

During momentary pressure surges in the main valve passageway only the portion of the total pressure area of the valve means which is directly acted on by fluid in the said passageway is subject to the peak surge pressures. Due to the time delay introduced by the restricted passageway, the remaining pressure area is instead subjected initially to the lower pressure which obtained at the commencement of the pressure surge and subsequently to progressively higher pressures as flow through the said restricted passageway occurs. Both pressure areas on the valve means, on the other hand, are subjected to a sustained or continuing high pressure equally, the time delay introduced by the restricted passageway, in this instance, having no effect. Thus, it will be seen that the frangible means holding the valve closed will be broken and the valve will be opened at different pressure levels respectively for momentary high pressures and for sustained or continuing high pressures. Since the effective pressure area on the valve means is smaller for momentary high pressures than for sustained high pressures, the valve will only open subject to momentary pressures which are substantially higher than the valve's opening pressure for sustained high pressures.

In accordance with the present invention, there is provided a relief valve housing through which the aforesaid pressure relieving fluid passageway extends. The housing is adapted for connection with an enclosure containing a fluid under pressure so that the passageway extending therethrough may serve to conduct fluid from the said enclosure to a low pressure environment for pressure relief. In the preferred embodiment of the invention shown in the drawing, the relief valve housing is formed of a pair of concentric sleeves 10 and 12, one disposed within the other. The outer sleeve 10 is adapted at its inner end for connection with an enclosure or conduit containing fluid under pressure. External threads 14 provided at the inner end of the sleeve 10 are shown engaged with an internally threaded end portion of a boss 16 formed on a conduit or other enclosure, not shown. The outer sleeve 10 serves to retain the relief valve in the boss 16 and may, accordingly, be referred to hereinafter as a retaining sleeve.

The inner sleeve 12 which is disposed within the retaining sleeve 10 engages at its inner end an annular shoulder 18 formed internally in the boss 16. The outer end of the sleeve 12 is axially spaced from a radially inwardly extending lip 20 formed at the outer end of the retaining sleeve 10. From the foregoing, it will be seen that a pressure relieving fluid passageway 22 extending from the boss 16 to the atmosphere is defined by the inner sleeve 12 and the radially extending lip 20 on the retaining sleeve 10. Obviously, communication of the said fluid passageway with a low pressure environment other than the atmosphere may be readily provided for by adapting the outer end of the retaining sleeve 10 for connection with a suitable conduit or other enclosure.

The before-mentioned valve means which is held by frangible means in closed position in the pressure relieving fluid passageway of the relief valve comprises, in preferred form, a piston valve 24 which is received in the outer end portion of the sleeve 12. The said sleeve thus constitutes a piston sleeve and may hereinafter be referred to as such. As best illustrated in Fig. 2, the piston valve 24 preferably comprises two threaded together piston members 26 and 28. The piston member 26 engages at its circumeferential surface the lip 20 formed at the outer end of the retaining sleeve 10 and has an integrally formed axial extension 30 of reduced diameter which extends toward the inner ends of the housing sleeves 10 and 12. A first portion of the piston extension 30 is provided with external threads 32. The piston member 28 is annular in form and is provided with internal threads 34 adapted to engage the threads 32 on the axial extension 30 of the piston member 26. An annular enlargement 36 on the piston member 28 has its circumferential surface engaging the interior surface of the piston sleeve 12 at an increased diameter outer end portion 38 of the said sleeve.

The frangible means which holds the valve means in the pressure relieving fluid passageway may take various forms within the scope of the invention. When, as in the preferred embodiment of the invention a two part piston valve 24 is provided, the said frangible means preferably comprises a shear ring 40. The ring 40 is disposed partially in the annular recess or axial space between the outer end of the piston sleeve 12 and the lip 20 of the retaining sleeve 10 and partially in an annular recess in the piston valve 24 defined by the adjacent radially extending faces of the piston members 26 and 28. It will be readily seen that when the retaining sleeve 10 is turned tightly into the boss 16, the piston sleeve 12 will engage the shoulder 18 and be urged outwardly. Thus, the shear ring 40 will be securely clamped between the outer end of the sleeve 12 and the retaining sleeve lip 20. Similarly, when the threaded extension 30 of the piston member 26 is turned tightly into the annular piston member 28, the shear ring 40 will be securely clamped between the adjacent radially extending faces of the said two piston members. The frangible means comprising the shear ring 40 therefore is connected with the valve housing and with the valve means comprising the piston valve 24 so as to resist movement of the said piston valve toward the outer end of the piston sleeve 12 or in the fluid passageway opening direction.

The before-mentioned pressure area on the valve means whereon fluid under pressure in the fluid passageway 22 acts directly to open the valve comprises the inner end of the piston valve 24, i.e., the inwardly exposed end surface of the annular piston member 28 and the inwardly exposed end surface of the axial extension 30 on the piston member 26. It will be readily apparent that due to the relatively large cross sectional area of the fluid passageway 22, this first portion of the piston valve 24 will be affected immediately by any pressure change in the fluid containing enclosure to which the pressure relief valve is connected.

The remaining pressure area on the valve means which is subjected to the pressure of fluid from the passageway 22, which fluid is first passed through a restricted fluid passageway, comprises the inwardly exposed surface of the annular enlargement 36 on the piston member 28. This second portion of the piston valve 24 is acted on by fluid in an annular chamber 42 defined in the valve housing by the said piston valve and the piston sleeve 12.

The annular chamber 42 receives fluid under pressure from the passageway 22 through a pair of restricted fluid passageways 44, 44 which extend thereto in the piston valve 24 and specifically in the member 28 thereof from the inwardly exposed end surface of the said piston valve. It will be understood, of course, that the chamber 42 may be otherwise supplied with fluid from the passageway 22, such as by a restricted passageway provided in the valve housing. For preventing the leakage of fluid to the annular chamber 42 from the passageway 22, there is provided in a suitable annular recess 46 in the periphery of the piston valve member 28 an O-ring seal 48.

From the foregoing it will be apparent that the retaining force exerted by the shear ring 40 may be overcome and the piston valve moved out of the sleeve 12, as illustrated in Fig. 3, by either a sustained or a momentary high pressure. It will be further apparent that due to the time delay introduced by the restricted passageways 44, 44 momentary high pressures of less than a predetermined duration will be effective only on the inwardly exposed end surface of the piston valve. Sustained pressures, on the other hand, are effective on both the said end surface and the inwardly exposed surface of the annular enlargement 36. Thus, the ring 40 will be sheared and the valve opened at a first predetermined pressure level for sustained high pressures and at a second and higher predetermined pressure level for momentary high pressures.

When the restraining force of the shear ring 40 is overcome, the piston valve 24 moves sharply out of the sleeve 12. In order to prevent the said valve from striking and possibly seriously damaging adjacent objects, there is provided a means of retaining the valve in an open position adjacent the outer end of the said sleeve. In preferred form, the said retaining means comprises a yoke 50 formed integrally on the inwardly exposed end of the axial extension 30 of the piston member 26. An axially extending slot 52 is provided in the yoke 50 and a pin 54 extends through the said slot. The ends of the pin 54 extend into suitable apertures 56, 56 in the piston sleeve 12. It will be readily seen that movement of the piston valve 24 outwardly from the sleeve 12 is limited by engagement of the pin 54 with the inner end of the yoke slot 52.

The invention claimed is:

1. A pressure relief valve comprising a housing adapted for connection with an enclosure containing fluid under pressure and having a generally cylindrical fluid passageway therethrough for conducting fluid from the enclosure to a low pressure environment, a generally cylindrical piston valve having an annular enlargement thereon disposed in said passageway and urged in the passageway opening direction by fluid under pressure from the enclosure acting on one end thereof, frangible means connected with said piston valve and housing for resisting passageway opening movement of said valve, an annular chamber defined by said piston valve and housing adjacent the annular enlargement on said valve for receiving fluid under pressure for action on said valve enlargement for passageway opening movement of said valve, and a restricted fluid passageway extending in said piston valve from said one thereof to said chamber for supplying fluid under pressure thereto.

2. A pressure relief valve comprising a housing adapted for connection with an enclosure containing fluid under pressure and having a generally cylindrical fluid passageway therethrough for conducting fluid from the enclosure to a low pressure environment, a generally cylindrical piston valve having an annular enlargement thereon disposed in said passageway and urged in the passageway opening direction by fluid under pressure from the enclosure acting on one end thereof, a shear ring disposed partially in an annular recess in said housing and partially in an annular recess in said piston valve for resisting passageway opening movement of the said valve, an annular chamber defined by said piston valve and housing adjacent the annular enlargement on said valve for receiving fluid under pressure for action on said valve enlargement for passageway opening movement of said valve, and a restricted fluid passageway extending in said piston valve from said one end thereof to said chamber for supplying fluid under pressure thereto.

3. A pressure relief valve comprising a retaining sleeve adapted at its inner end for connection with an enclosure containing fluid under pressure and having at its outer end a radially inwardly extending lip, a piston sleeve having a portion of its interior surface near the outer end thereof of increased diameter embraced by said retaining sleeve with the outer end of said piston sleeve axially spaced from said retaining sleeve lip, a piston valve disposed in said piston sleeve and having an annular enlargement near its outer end engaging at its circumference the increased diameter portion of said sleeve and defining with said sleeve an annular chamber adjacent its inwardly exposed surface, a shear ring secured between the lip on said retaining sleeve and the outer end of said piston sleeve and extending radially inwardly and engaging said piston valve to resist movement thereof out of said piston sleeve, and a restricted fluid passageway in said piston valve extending from the inner end thereof to said annular chamber whereby fluid under pressure is permitted to act on the inwardly exposed surface of said valve enlargement as well as on the inwardly exposed surface at the valve inner end to urge said valve out of said piston sleeve.

4. A pressure relief valve comprising a retaining sleeve adapted at its inner end for connection with an enclosure containing fluid under pressure and having at its outer end a radially inwardly extending lip, a piston sleeve having a portion of its interior surface near the outer end thereof of increased diameter embraced by said retaining sleeve with the outer end of said piston sleeve axially spaced from said retaining sleeve lip, a piston valve disposed in said piston sleeve and having an annular enlargement near its outer end engaging at its circumference the increased diameter portion of said sleeve and defining with said sleeve an annular chamber adjacent its inwardly exposed surface, a shear ring secured between the lip on said retaining sleeve and the outer end of said piston sleeve and extending radially inwardly and engaging said piston valve to resist movement thereof out of said piston sleeve, and a restricted fluid passageway in said piston valve extending from the inner end thereof to said annular chamber whereby fluid under pressure is permitted to act on the inwardly exposed surface of said valve enlargement as well as on the inwardly exposed surface at the valve inner end to urge said valve out of said piston sleeve, a yoke secured to the inner end of said piston valve and having an axially extending slot therethrough, and a pin extending through said slot and fixedly connected at each end to one of said sleeves.

5. A pressure relief valve comprising a housing adapted for connection with an enclosure containing fluid under pressure and having a fluid passageway therethrough for conducting fluid from the enclosure to a low pressure environment, a normally closed movable valve element having first and second pressure surfaces facing approximately in the same direction and disposed in said passageway, said valve element being urged in the passageway opening direction by fluid from the enclosure acting over said first pressure surface, frangible means connected with said valve element and housing for resisting passageway opening movement of said valve element, a chamber in said housing adjacent the second pressure surface of said valve element and between said first and second pressure surfaces, and said valve element having a restricted fluid passageway opening through its said first pressure surface for supplying fluid under pressure to said chamber from the fluid containing enclosure, the fluid in said chamber acting on said second pressure surface to exert a net pressure force on said valve element tending to urge the same in the passageway opening direction.

6. A pressure relief valve comprising a housing adapted for connection with an enclosure containing fluid under pressure and having a fluid passageway therethrough for conducting fluid from the enclosure to a low pressure environment, a normally closed movable piston valve having first and second pressure surfaces facing approximately in the same direction and disposed in said passageway, said piston valve being urged in the passageway opening direction by fluid from the enclosure acting over said first pressure surface, frangible means connected with said piston valve and housing for resisting passageway opening movement of said piston valve, a chamber defined by said piston valve and housing adjacent the second pressure surface of said valve, and a restricted fluid passageway in said piston valve for supplying fluid under pressure to said chamber from the fluid containing enclosure, the fluid in said chamber acting on said second pressure surface to exert a net pressure force on said piston valve tending to urge the same in the passageway opening direction.

References Cited in the file of this patent
UNITED STATES PATENTS

| | | |
|---|---|---|
| 1,584,523 | Egbert | May 11, 1926 |
| 1,970,718 | Tryon et al. | Aug. 21, 1934 |
| 2,230,961 | Lewis | Feb. 4, 1941 |

UNITED STATES PATENT OFFICE
CERTIFICATE OF CORRECTION

Patent No. 2,920,790                                                              January 12, 1960

Raymond N. Quenneville et al.

It is hereby certified that error appears in the printed specification of the above numbered patent requiring correction and that the said Letters Patent should read as corrected below.

Column 5, line 9, before "thereof" insert -- end --.

Signed and sealed this 7th day of June 1960.

(SEAL)
Attest:

KARL H. AXLINE                                      ROBERT C. WATSON
Attesting Officer                                 Commissioner of Patents